Patented June 5, 1934

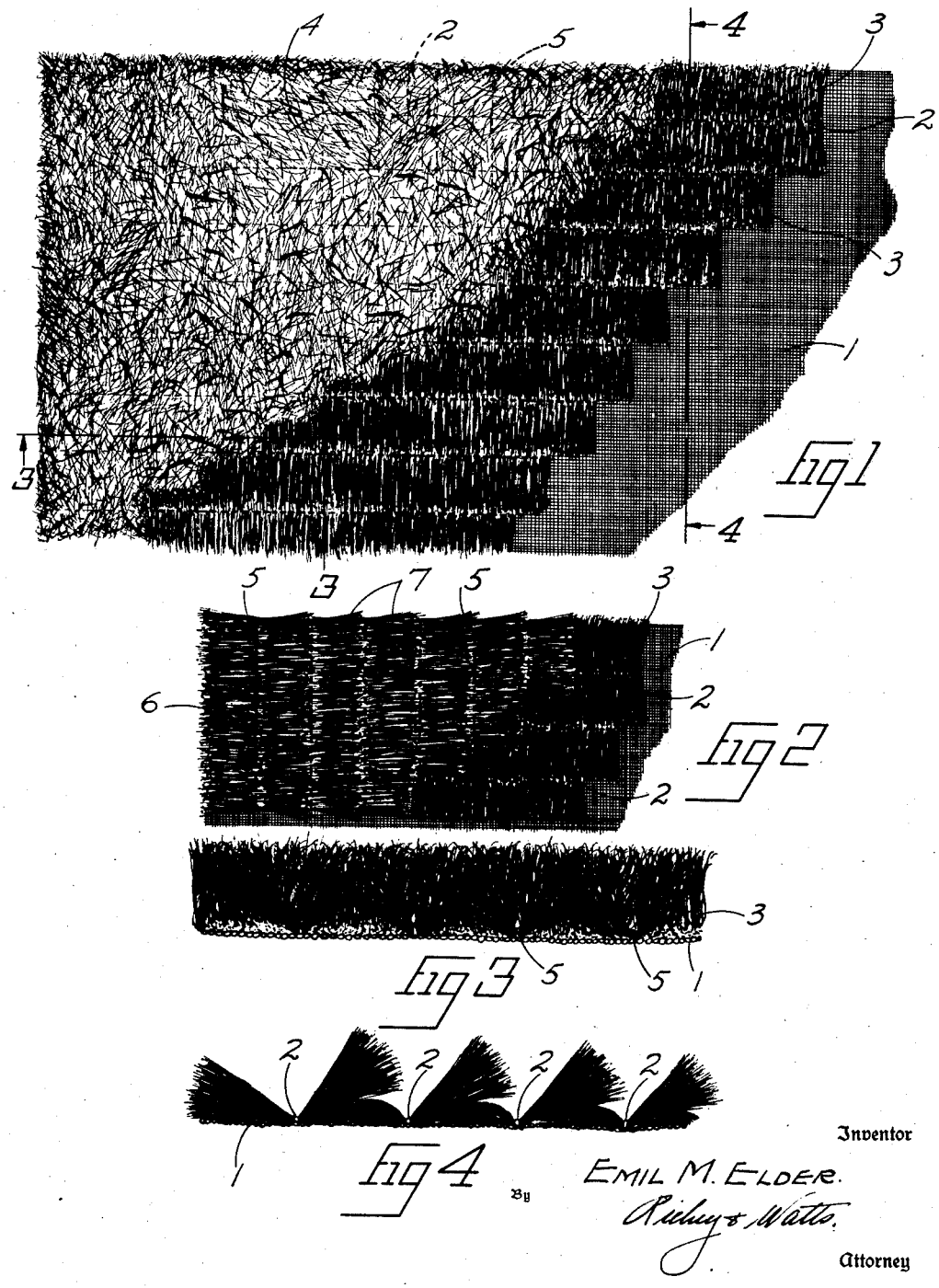

1,961,139

UNITED STATES PATENT OFFICE 1,961,139

ARTIFICIAL GRASS AND THE LIKE

Emil M. Elder, Cleveland, Ohio, assignor, by direct and mesne assignments, of one-half to The Joseph M. Stern Company, Cleveland, Ohio, a corporation of Ohio, and one-half to Hamburg Floral Mfg. Co. Inc., Hamburg, N. Y., a corporation of New York Application October 23, 1933, Serial No. 694,917

8 Claims. (Cl. 112—1)

This invention relates to covering materials and more particularly to artificial grass of the type generally used by funeral directors and cemetery associations to cover the ground around newly dug graves and also adapted for other uses such as stage settings, window decorations, etc., where it is desired to accurately simulate live grass.

I am aware that artificial grass has been in extensive use which is made up of a fabric backing sheet to which grass resembling fibers are secured by stitching, or other suitable means. The material used for the grass resembling fibers is commonly raffia or the like dyed to the desired color. The artificial grass with which I am familiar is made up of a woven fabric backing sheet to which are stitched parallel rows of short raffia fibers. These rows of fibers are applied to the backing in overlapping shingle fashion and after the fibers have been dyed and brushed they project upwardly and give somewhat the appearance of real grass when the material is laid on a flat surface, although the tendency is for the fibers to lie in one direction and for the rows to be discernible. Moreover, if this type of material is laid on a curved surface so that the backing sheet is bent in the direction in which the rows of fibers extend, the fabric backing sheet is exposed to view and the illusion of growing grass is destroyed.

This defect is inherent in this type of material because there is a blank space between the stitching lines of the adjacent rows of fibers. Another defect of this old type of grass mat is that, after the mats have been used for a time some of the fibers may become loose and drop out due to breaking of the stitching threads or drying out of the fibers so that they are pulled out in the ordinary handling of the material. When this occurs a portion of the backing fabric is exposed and, of course, the grass-like appearance is completely destroyed.

It is among the objects of my invention to provide an artificial grass mat which will give an accurate simulation of real grass. Other objects of my invention are the provision of artificial grass of the type described in which the backing sheet will never be exposed to view regardless of how the material may be bent or laid; the provision of artificial grass which may be treated with a moisture collecting chemical whereby the fibers of the grass will remain moist and possess approximately the softness and feel of natural grass for the maximum period of time; the provision of artificial grass of the type described which may be used for a long period of time without losing its grass-like appearance and which is adapted to resist the drying out and bleaching action of the sun to a greater extent than has been possible in previously proposed materials of this type; the provision of an artificial grass mat which will retain its grass-like appearance even though, due to hard usage, some of the sitching threads may become broken or loosened and some of the fibers lost; the provision of an artificial grass mat in which the fibers will stand up and extend in all directions rather than in uniform rows as in previously proposed materials of this type and thereby accurately imitate the natural growing grass; and the provision of artificial grass of the type described in which the fibers are evenly distributed over the surface of the backing material.

The above and other objects of my invention will appear from the following description of a preferred embodiment of my invention, reference being had to the accompanying drawing, in which—

Figure 1 is a plan view of my improved material with parts of the superimposed layers removed to more clearly show the construction;

Figure 2 is a plan view somewhat similar to Figure 1, but showing the mat in unfinished condition before the fibers are dyed and/or brushed;

Figure 3 is an enlarged cross sectional view taken on line 3—3 of Figure 1 showing my improved artificial grass in finished form;

Figure 4 is an enlarged cross sectional view taken on line 4—4 of Figure 1 illustrating the backing sheet with only the under layer of rows of fibers attached thereto. This view may also be considered as a cross sectional view of a type of artificial grass used prior to my invention.

Referring now to Figure 1, a flexible backing sheet 1, preferably burlap, canvas or other suitable woven fabric, has a layer of parallel rows 3 of grass resembling fibers, such as raffia, sewed thereto by the stitching lines 2. As is best seen in Figure 4 this bottom layer of rows 3 of fibers is arranged with the stitching lines substantially parallel and spaced approximately one-half of the length of the fibers. In the process of manufacture, when the lower layer of fibers is being attached to the backing sheet 1 the rows 3 are laid in overlapping shingle arrangement as shown in Figure 4, the row of fibers at the right hand side of Figure 4 being first stitched to the fabric and the other rows being successively applied with one-half of the length of the fibers of each row overlying one-half of the length of the fibers of the previously applied row. The previously used artificial grass with which I am familiar is made in the manner just described and it will be seen that, if this material is bent on lines extending parallel to the stitching lines 2 the fibers of the adjacent rows will separate and the fabric between the stitching lines 2 will be exposed to view.

In my improved artificial grass I apply a second layer of rows of fibers over the above described first layer. In this second layer the rows and stitching lines 5 extend at an angle, preferably substantially 90°, to the rows and stitching lines of the first layer. As illustrated, the rows of the outer layer are arranged relative to each other in the same manner as the rows of the under layer. The portion 6 of Figure 2 illustrates the appearance of my mat after the stitching operations have been completed, but before the mat has been dyed, brushed and treated with the moisture collecting chemical. In this portion 6 it will be noted that the rows 7 of fibers of the outer layer overlie and extend across the rows 3 of the under layer of fibers.

In the manufacture of my improved material the rows of the under layer of fibers are first stitched to the backing sheet and may extend either lengthwise, transversely or diagonally of the strip of backing material to which they are attached. After the surface of the strip of backing material is completely covered with the bottom rows of fibers, the outer rows of fibers are stitched to the backing sheet and extend across the rows of the previously applied under layer. I prefer to use fibers of the same length in the rows of both the under and outer layers and to stitch these fibers to the backing sheet so that approximately half of each fiber lies on each side of its stitching line. The stitching lines are preferably spaced approximately one-half the length of the individual fibers and although I prefer to space the rows of both the under and outer layers the same distance, it may in some cases be desirable to space the rows of the bottom layer a greater distance than those of the top layer. It will be understood that the stitching lines may be applied by any suitable type of sewing machine and that any thread or cord of the desired strength may be used to secure the fibers to the backing sheet. One satisfactory way of applying the fibers to the backing sheet is for the operator to run the backing material through a sewing machine and spread a bundle of fibers, all arranged in parallel relation, along the sheet just ahead of the needle of the sewing machine so that the fibers are secured to the sheet by the stitching before they have a chance to become disarranged on the sheet.

After the two layers of rows of fibers have been stitched to the backing sheet as above described the material will have the appearance of the portion 6 of Figure 2 and the fibers of the bottom layer will be covered by the fibers of the outer layer which will extend in rather uniform fashion on either side of their stitching lines. This material is next dyed the proper color and brushed and the combined action of the dye, which expands the raffia fibers, and the brushing will cause the fibers of both the under and outer layers to stand up and extend in all directions thereby accurately simulating the appearance of natural growing grass. The portion 4 of Figure 1 illustrates the appearance of the finished product after the dying and brushing operations. The stitching lines 2 of the under layer are disposed at right angles to the stitching lines 5 of the outer layer and, as these stitching lines are completely hidden in the finished product they are shown as light dotted lines in the portion 4 of Figure 1.

The manner in which the stitching lines are concealed by the up-standing fibers is also illustrated in Figure 3.

My improved criss-cross arrangement of the rows of fibers on the backing sheet provides a complete double layer of grass-like covering over all parts of the backing sheet and increases the durability of the mat as the material is greatly re-inforced by the oppositely extending stitching lines and the extra heavy and uniform covering of fibers protects the stitching and affords a long wearing surface. As is seen in Figure 1 the stitching lines cross each other forming a pattern of squares outlined by the stitching lines. If one of the underlayer stitching threads should break it will not loosen and permit the fibers to drop out beyond the points where the next transverse stitching lines cross the broken thread. Thus, with my construction, even if an underlayer thread should break the releasing of the fibers would be confined to a distance equal to that between two adjacent parallel transverse stitching lines. This crossed arrangement of the stitching lines also prevents excessive stress upon the individual threads of the lines when the mat is being jerked or pulled to arrange it in position because a load imposed on any stitching line or thread will be, to a considerable extent, distributed throughout a number of the transversely extending threads. With the old style mats of the single layer type described above the bleaching action of the sun may cause the green raffia fibers or blades to turn a yellowish brown and, due to the fact that there is but a single layer of fibers on the backing sheet, when this occurs the usefulness of the material is destroyed. With my improved product, however, even though the sun may bleach the outer fibers, the under layer will remain in its original condition for a relatively long time and, as the bleached and dried fibers shrivel up the fresh green underneath layer of fibers will be exposed and the mat may be kept in use. In this action the underneath fibers, which have been protected by the outer fibers will rise up and in a manner replace the outer fibers which may have become dried and shrivelled. A large number of the fibers or blades of the bottom layer are held down and protected by the outer layer of blades. These fresh green under blades are in effect "reserve" blades which automatically become visible and take the place of worn, faded and shrivelled blades on the outer layer thus greatly increasing the life and enhancing the appearance of the mat.

As noted above mats of this type are treated with a chemical which acts to collect moisture thereby maintaining the raffia in a soft condition so that it resembles and feels like natural grass. Treating the mat with calcium or magnesium chloride so that fibers and backing sheet are impregnated with the chemical is one way of obtaining this result. The action of the sun and rain upon the mats tends to destroy the effectiveness of the chemical treatment of the exposed fibers. With my improved double layer grass mat, the under fibers will retain the moisture collecting chemical even after the effectiveness of the chemical on the outer fibers has been destroyed and I have found that as long as the under fibers retain their moisture collecting property sufficient moisture will be absorbed by the mat to maintain it in the desired state. The under fibers and the backing sheet being relatively protected from exposure, retain the moisture collecting chemical for a long time and will continue to collect enough moisture to constantly refresh the outer fibers of the mat thus preventing the sun and air from drying the outer fibers causing them to shrivel and fade and lose their true grass-like appearance. Thus, with my double layer fiber construction, impregnated with a moisture attracting or collecting chemical of suitable type, the original appearance of my mat is preserved and maintained and longer and more satisfactory service of the product is obtained.

When the raffia fibers dry out they also shrivel up. In the old single layer type of mat the individual rows of fibers are then clearly seen and, due to the shrivelling up of the fibers, bare spaces are created between the rows through which the fabric backing material may be observed. With my improved material in which the superimposed layers of fibers are laid in opposite directions, this will not occur even though, after long use, a large number of the fibers should dry and shrivel up because of the complete and heavy covering of the backing material by the oppositely extending rows of fibers, and thus the effective life of the mat is greatly increased.

From the above it will be seen that my improved artificial grass mat overcomes the serious defects of the old style mats and in addition provides longer wear and a more realistic imitation of growing grass.

By making my artificial grass with a plurality of superimposed layers of rows of fibers, the rows of one layer extending transversely across the rows of the other layer, I provide a material which has a thick, heavy covering of grass resembling fibers which completely conceal the backing sheet to which they are attached and, by virtue of the fact that the rows of the superimposed layers run in opposite directions, the backing sheet will not be exposed to view regardless of how it may be bent or distorted out of a flat plane. Another advantage of my construction is that after the outer exposed fibers have become dried and shrivelled in use the under fibers which have been held down by the fibers of the outer layer will stand up and take the place of the dried and shrivelled fibers and the desired appearance of the grass will be maintained.

Although I have specifically noted that a burlap like fabric and raffia fibers may be used in the manufacture of my improved artificial grass it will be seen by those skilled in the art that other suitable flexible backing sheets and other grass resembling fibers or strands might be used without departing from the spirit of my invention. It will also be understood that it is not absolutely essential that the rows of the superimposed layers lie absolutely at right angles to each other, as it is possible that the rows might be disposed at an acute angle less than 90° and still obtain a satisfactory product. Where the term "transversely" is used in this specification and the following claims it is intended to include all angles at which the rows of one layer may extend relative to the rows of another layer. I do not, therefore, limit my invention to the specific materials and arrangements herein shown and described but claim as my invention all embodiments thereof coming within the scope of the appended claims.

I claim:

1. Artificial grass of the type described comprising a woven fabric backing sheet having a layer of parallel bottom rows of fibers secured to the backing sheet by stitching lines, the length of the fibers being greater than the distance between adjacent lines of stitching, and a layer of similar parallel top rows of fibers secured to the backing sheet by stitching lines, said top rows of fibers extending at substantially right angles to said bottom rows of fibers.

2. Artificial grass or the like, comprising a flexible backing sheet having a plurality of superimposed layers of rows of grass resembling fibers secured to one side of said sheet, each fiber being secured to the backing sheet at a point substantially midway between its ends, the fibers of each row extending transversely of the direction of the row and the rows of each layer extending transversely of the rows of an adjacent layer.

3. Artificial grass comprising a flexible backing sheet, a plurality of rows of grass like fibers secured to said backing sheet by stitching lines, each of said rows having its fibers extending in a direction substantially normal to the direction of the stitching line which secures the fibers of the row to the backing sheet, said stitching lines securing the individual fibers of the row to the backing sheet at a point between their ends, said rows being arranged in layers with the rows of the outer layer overlying and extending substantially at right angles to the rows of the layer which is next to the backing sheet.

4. Artificial grass or the like, comprising a backing sheet having a plurality of superimposed layers of grass resembling fibers secured to one side of said sheet, each of said layers being made up of substantially parallel rows of fibers, the fibers of each row extending transversely of the direction of the row and the rows of each layer extending transversely of the rows of an adjacent layer.

5. Artificial grass or the like, comprising a flexible backing sheet, an under layer of grass resembling fibers secured to said backing sheet in substantially parallel rows by stitching lines, and an outer layer of grass resembling fibers applied over said under layer and arranged in substantially parallel rows secured to said backing sheet by stitching lines and extending transversely of the rows of said under layer, the rows of each of said layers being substantially equally spaced.

6. An artificial grass mat comprising a flexible backing sheet and superimposed layers or rows of grass resembling fibers secured thereto, the fibers of each row extending transversely of the direction of the row and the rows of each layer extending transversely of the rows of an adjacent layer, said mat being impregnated with a moisture collecting chemical.

7. Artificial grass or the like comprising a flexible backing sheet, an under layer of grass resembling fibers secured to said backing sheet in substantially parallel rows by stitching lines, and an outer layer of grass resembling fibers overlying said under layer and arranged in substantially parallel rows secured to said backing sheet by stitching lines and extending transversely of the rows of said under layer, the backing sheet, fibers and stitching being impregnated with a moisture collecting chemical.

8. Artificial grass or the like, comprising a flexible backing sheet having a plurality of superimposed layers of rows of grass resembling fibers secured to one side thereof, each fiber being secured to the backing sheet at a point substantially midway between the ends of the fiber and the length of the fibers being greater than the distance between the lines on which adjacent rows of fibers are secured to the sheet, the fibers of each row extending transversely of the direction of the row and the rows of one layer extending transversely of the rows of another layer.

EMIL M. ELDER.